UNITED STATES PATENT OFFICE.

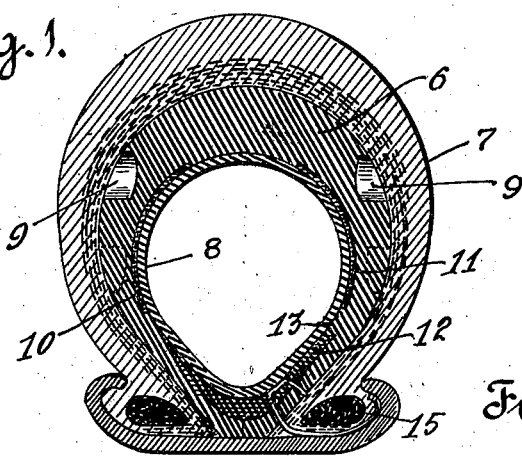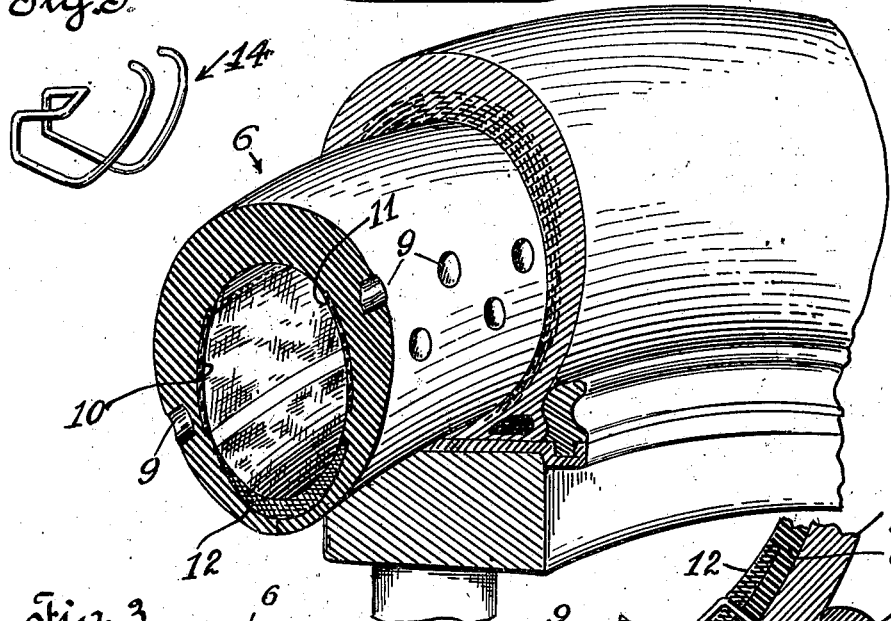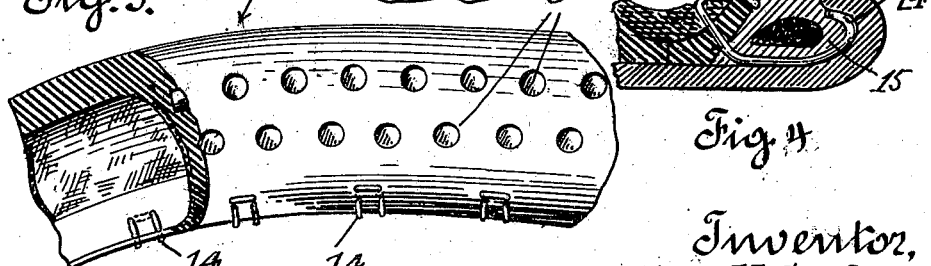

JOHN H. GRUBE, OF LOS ANGELES, CALIFORNIA.

INNER TIRE.

1,217,754.  Specification of Letters Patent.  Patented Feb. 27, 1917.

Application filed August 31, 1915. Serial No. 48,198.

*To all whom it may concern:*

Be it known that I, JOHN H. GRUBE, a citizen of the United States, residing at Los Angeles, in the county of Los Angeles and State of California, have invented new and useful Improvements in Inner Tires, of which the following is a specification.

This invention relates to a combination inner tire and tube for pneumatic outer casings.

It is the object of this invention to provide an inner tire for outer casings of pneumatic tires adapted to be interposed between a reduced inner inflatable removable tube and the outer casing for the purpose of protecting the former against puncture and reinforcing the latter against blow-out, and which will also serve to increase the wearing quality of the outer casing.

Another object is to provide a combination inner tire and tube which is so constructed that it will conform to the inner wall of the outer casing when the inner tube is inflated therein irrespective of irregularities, or stretch usually present in old tires so that it will readily fit old and distorted outer casings as well as new, and thus overcome an objectionable feature found in inner-linings heretofore in use.

Another object is to provide an inner tire wall of resilient character which will form a supplemental cushion interiorly of the outer casing and thereby permit the inner tube being inflated at a greater pressure than ordinarily employed without destroying the shock-absorbing quality of the tire, and at the same time gaining a stronger side wall, and fortify against rim cut.

A further object is to provide an inner tire which is simple in construction and adaptability and economical in manufacture.

Other objects will appear hereinafter.

The invention is illustrated in the accompanying drawings in which:

Figure 1, is a view in transverse section of an ordinary pneumatic tire showing the invention as applied.

Fig. 2, is a detail in perspective and section illustrating the application of the invention.

Fig. 3, is a detail in side elevation of the inner tire with parts broken away.

Fig. 4, is a detail illustrating the manner of attaching the inner tire to the outer casing.

Fig. 5, is a detail in perspective of the pliable hook for attaching the inner tire to the casing.

In carrying out the present invention, an annular tube 6 constituting the body portion of an inner tire is formed of any suitable resilient material, such as rubber, or rubber composition. This tube is formed with an outer surface of a shape substantially corresponding to the shape of the inner surface of the ordinary outer casing 7, and is divided circumferentially on its inner wall so that its side portions may be separated to permit the introduction and removal of the inner tube 8.

The outer peripheral wall of the inner tire is formed of considerable thickness and the side walls gradually converge in cross-section from the outer wall to the inner marginal edges of the inner tire, as particularly shown in Fig. 1. This shape provides a heavy body of resilient material opposite the tread portion of the outer casing of a thickness which, combined with the thickness of the outer casing, forms a wall through which ordinary nails, tacks, pins, and the like, cannot pass from the outer casing, thus protecting the inner tube 8 against puncture. Furthermore, the resilient outer walls of the inner tire serve to deflect nails and the like entering the outer casing so that where nails of sufficient length are picked up they will seldom reach the inner tube.

The thin side portions of the inner tire extend adjacent the juncture of the outer casing with the wheel rim and while reinforcing the outer casing at this point, do not destroy the resiliency of the tire.

As a means for increasing the flexibility of the inner tire, at the juncture of the tread portion thereof with its side portion, so as to prevent the side portions of the outer casing being rendered excessively rigid by the inner tire the latter is formed with a series of depressions 9 in its outer face. Two rows of the depressions are preferably provided and arranged in staggered relation to each other as shown in Fig. 3. These depressions may be spaced at any suitable distance apart and formed of such depth as to give the outer wall of the inner tire the desired flexibility and permit ready vertical depression thereof. The inner wall of the inner tire is reinforced opposite the depressions 9 by means of fabric lining strips 10 and 11 which extend along the inner side portions of the inner tire and are spaced apart at their adjacent edges so as to permit transverse expansion of the inner tire when the inner tube 8 is inflated and thus permit the inner tire being expanded to conform to irregularities in the outer casing.

Mounted on the inner wall of one of the side portions of the inner tire is a fabric flap 12 which seats in a depression 13 in the inner tire so as to lie flush with the inner face of the latter. This flap is designed to extend over the joint between the divided edges of the inner tire when the latter is applied and fitted with the inner tube 8 as particularly shown in Fig. 1. The flap 12 being interposed between the inner tire and the inner tube, prevents the latter from being crowded into the joint in the inner tire, and obviates pinching of the inner tube on inflation thereof.

The inner tire may be rigidly attached to the outer casing and for this purpose is fitted with a series of pliable hooks 14 particularly shown in Fig. 5, which hooks are arranged adjacent to the inner periphery of the inner tire and are adapted to be bent around and engaged with the side flanges 15 of the outer casing as particularly shown in Fig. 4.

I claim:

1. An inner tire, comprising an annular tubular member divided circumferentially on its inner periphery and having inwardly converging side walls formed with peripherally spaced depressions at the juncture of the outer wall with the side walls, and annular fabric reinforcing strips on the inner portion of the side walls arranged back of the depressions.

2. An inner tire comprising an annular tubular member divided circumferentially on its inner periphery and having inwardly convergent side walls formed with lateral peripherally spaced depressions at the juncture of the outer wall with the side walls.

3. An inner tire comprising an annular tubular member divided circumferentially on its inner periphery and having inwardly convergent side walls formed with spaced and staggered lateral depressions at the juncture of the outer wall with the side walls, and annular spaced reinforcing strips on the side walls arranged opposite the depressions.

4. An inner tire comprising an annular tubular member divided circumferentially on its inner periphery and having inwardly convergent side walls formed with circumferentially arranged rows of spaced depressions at the juncture of the outer wall with the side walls, and means for attaching the inner tire to an outer casing.

5. The combination with an outer casing and an inner inflatable tube of an annular tubular member divided circumferentially on its inner periphery interposed between the tube and casing, having inwardly convergent side walls formed with depressions at the juncture of the side walls with the outer wall, annular fabric reinforcing strips on the inner faces of the side walls opposite the depressions and spaced apart, and means for removably attaching the annular member to the outer casing.

6. The combination with an outer casing and an inner inflatable tube of an annular tubular member divided circumferentially on its inner periphery interposed between the tube and casing, having inwardly convergent side walls, formed with depressions at the juncture of the side walls with the outer wall, annular fabric reinforcing strips on the inner faces of the side walls opposite the depressions and spaced apart, and means for removably attaching the annular member to the outer casing, comprising a series of spaced pliable hooks carried by the side walls.

In testimony whereof I have signed my name to this specification.

JOHN H. GRUBE.